US007417851B2

(12) United States Patent
Chen et al.

(10) Patent No.: US 7,417,851 B2
(45) Date of Patent: Aug. 26, 2008

(54) LATCH MECHANISM (75) Inventors: Hsuan-Chen Chen, Taipei Hsien (TW); Yong Yue, Shenzhen (CN); Chien-Li Tsai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/625,285

(22) Filed: Jan. 20, 2007

(65) Prior Publication Data

US 2007/0247791 A1      Oct. 25, 2007

(30) Foreign Application Priority Data

Apr. 21, 2006   (CN) .................... 2006 2 0013643 U (51) Int. Cl.
*H05K 7/12* (2006.01)

(52) U.S. Cl. .......................... 361/681; 361/727; 292/95

(58) Field of Classification Search ................ 361/681, 361/727; 292/95
See application file for complete search history.

(56) References Cited

U.S. PATENT DOCUMENTS

| 6,115,239 | A   |   | 9/2000 | Kim        |           |
|-----------|-----|---|--------|------------|-----------|
| 6,517,129 | B1  | * | 2/2003 | Chien et al. | 292/251.5 |
| 6,535,380 | B1  | * | 3/2003 | Lee et al. | 361/683   |
| 7,088,588 | B2  | * | 8/2006 | Lee        | 361/725   |

* cited by examiner

*Primary Examiner*—Jayprakash N Gandhi
*Assistant Examiner*—Ingrid Wright
(74) *Attorney, Agent, or Firm*—Wei Te Chung (57) ABSTRACT

A latch mechanism includes a latching member, a push member, and a sliding member. The latching member is slidably installed in a cover unit in parallel to a front wall thereof. The latching member includes a hook for engaging with a base unit. The push member is slidably installed in the cover unit parallel to a sidewall perpendicular to the front wall thereof. The sliding member is connectable with the push member, and is capable of being operated to drive the push member to push the latching member for disengaging the hook of the latching member from the base unit.

20 Claims, 7 Drawing Sheets

LATCH MECHANISM

BACKGROUND OF THE INVENTION

1. Field of the Invention

The present invention relates to a latch mechanism, and more particularly to a latch mechanism for a portable computer.

2. Description of Related Art

Typically, an electronic device, such as a portable computer, includes a cover unit and a base unit pivotally connected with the cover unit, and a latch mechanism is provided to lock the cover unit to the base unit.

As disclosed in U.S. Pat. No. 6,115,239, a latch mechanism for locking a cover unit to a base unit of a portable computer, includes a latch frame movably installed inside the cover unit, a plurality of latches are formed on the latch frame at predetermined intervals and one end portion of each latch protrudes from a front surface of the cover unit, and a slide knob is operatively connected to the latch frame for concurrently operating the latches. The latches are inserted into and locked by latch grooves formed at positions corresponding to the latches on an upper surface of the base unit. The latches are urged against the base unit by elastic forces applied by double springs mounted on two ends of the latch frame. However, the latch frame and the slide knob are installed on a front end of the cover unit. To open the cover unit, the slide knob is slid to overcome the elastic forces of the springs to move the latch mechanism for disengaging from the base unit. Typically, the forces of sliding the slide knob and opening the cover unit depend on friction between the slide knob and a thumb of an operator at the front of the portable computer. It is laborious for an operator to provide enough force to move a slide knob and open the cover unit depending on only one finger at the front of the portable computer.

What is needed, therefore, is a laborsaving latch mechanism.

SUMMARY OF THE INVENTION

An exemplary latch mechanism includes a latching member, a push member, and a sliding member. The latching member is slidably installed in a cover unit in parallel to a front wall thereof. The latching member includes a hook for engaging with a base unit. The push member is slidably installed in the cover unit parallel to a sidewall perpendicular to the front wall thereof. The sliding member is connectable with the push member, and is capable of being operated to drive the push member to push the latching member for disengaging the hook of the latching member from the base unit.

Other advantages and novel features of the present invention will become more apparent from the following detailed description of a preferred embodiment when taken in conjunction with the accompanying drawings, in which:

DETAILED DESCRIPTION OF THE INVENTION

Figure 4:
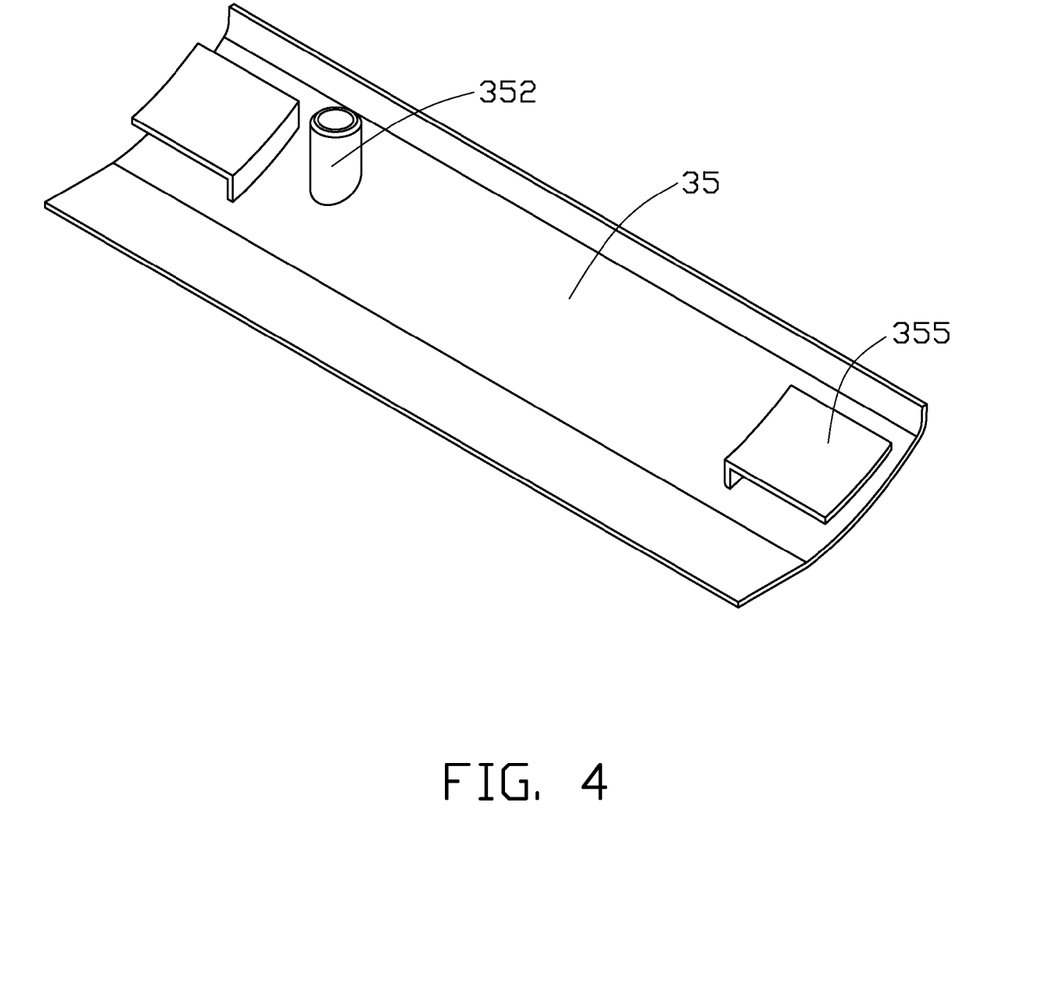
FIG. 4 is another aspect view of the sliding member of FIG. 1.
Figure 5:
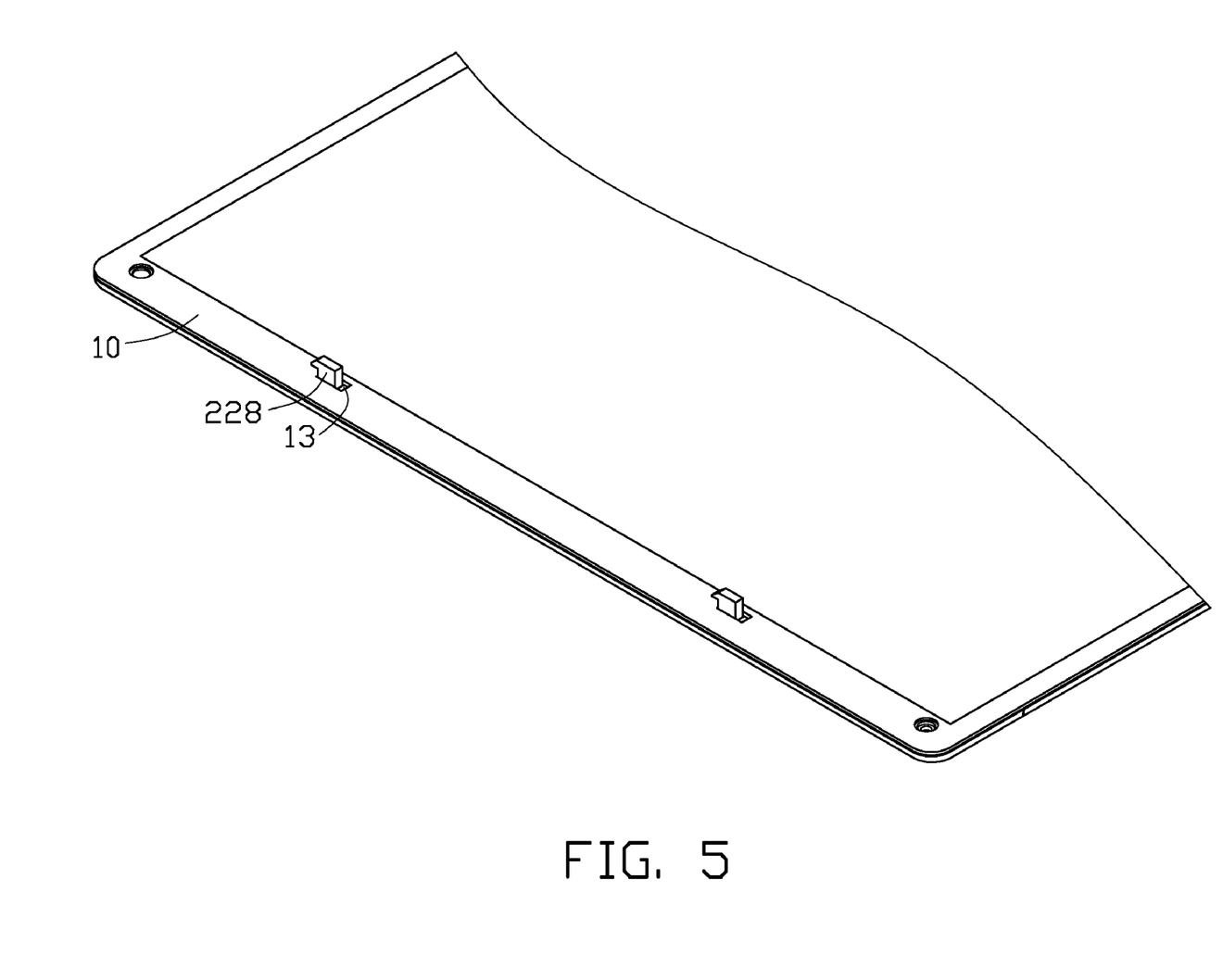
FIG. 5 is an assembled, partially sectioned view of FIG. 1, but viewed from another aspect.
Figure 6:
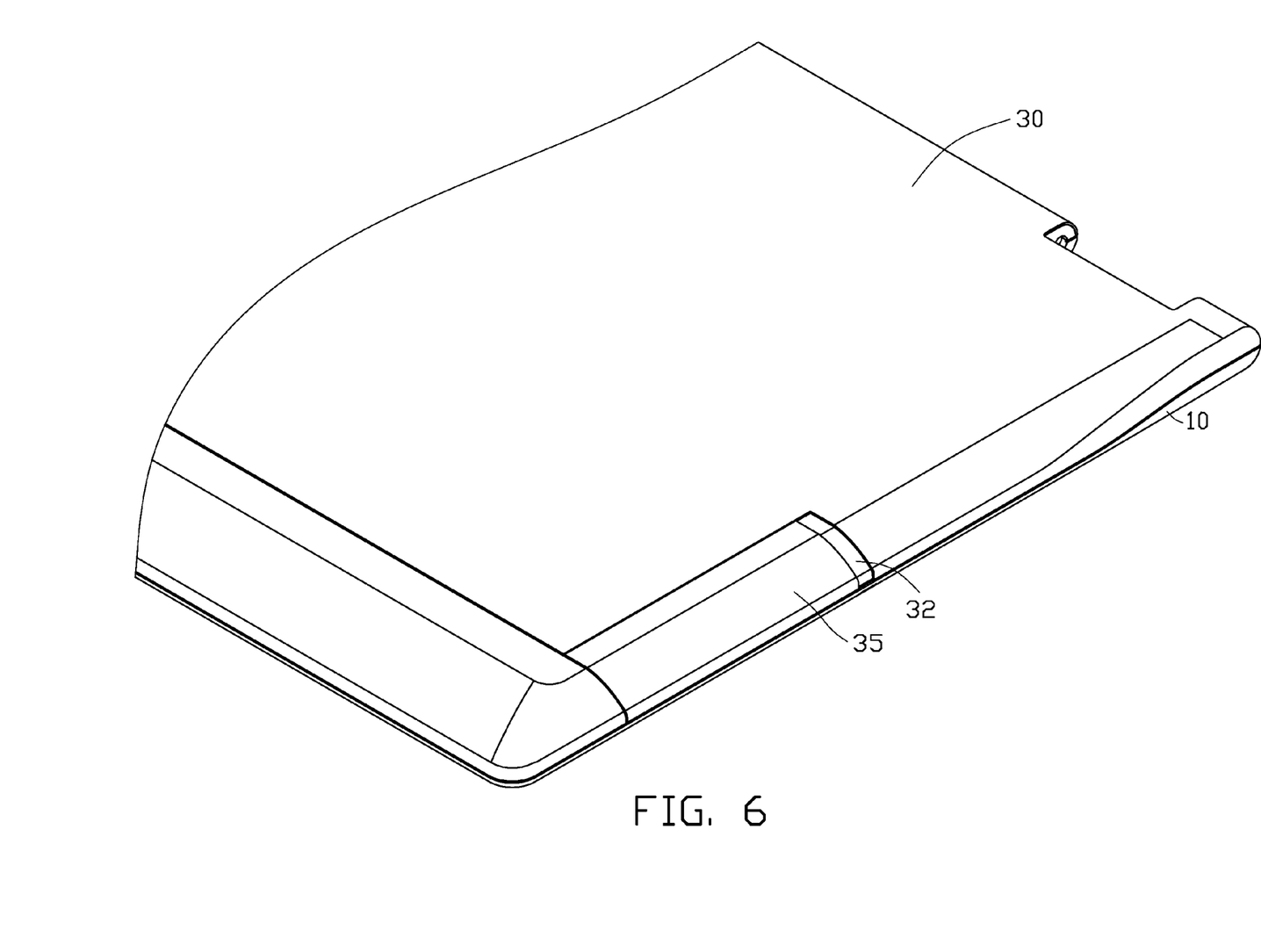
FIG. 6 is an assembled view of FIG. 1.

Referring to FIGS. 1 to 5, a latch mechanism is provided in accordance with a preferred embodiment of the present invention, for locking a cover unit to a base unit 50 (as shown in FIG. 6) of an electronic device, such as a portable computer. The latch mechanism includes a sliding member 35, a latching member 22, a push member 24, a first elastic member 42 for restoring the latching member 22, and a second elastic member 44 for restoring the push member 24. In this embodiment, the first elastic member 42 and the second elastic member 44 are coil springs.

The latching member 22 includes a bar-shaped body forming a slanted surface 226 on an end portion thereof. Two hooks 228 (see FIG. 5) protrude from a bottom portion of the latching member 22. A plurality of staggered notches 221 is defined in a front edge and a rear edge of the latching member 22. Two spaced sliding slots 223 are defined in the latching member 22, and a receiving recess 222 is defined in a middle portion of the latching member 22 between the sliding slots 223. A post 224 (see FIG. 3) extends from a portion of the latching member 22 bounding the receiving recess 222 into the receiving recess 222. The post 224 is oriented generally along a longitudinal axis of the receiving recess 222 and is for the first elastic member 42 to be placed thereon.

Figure 2:
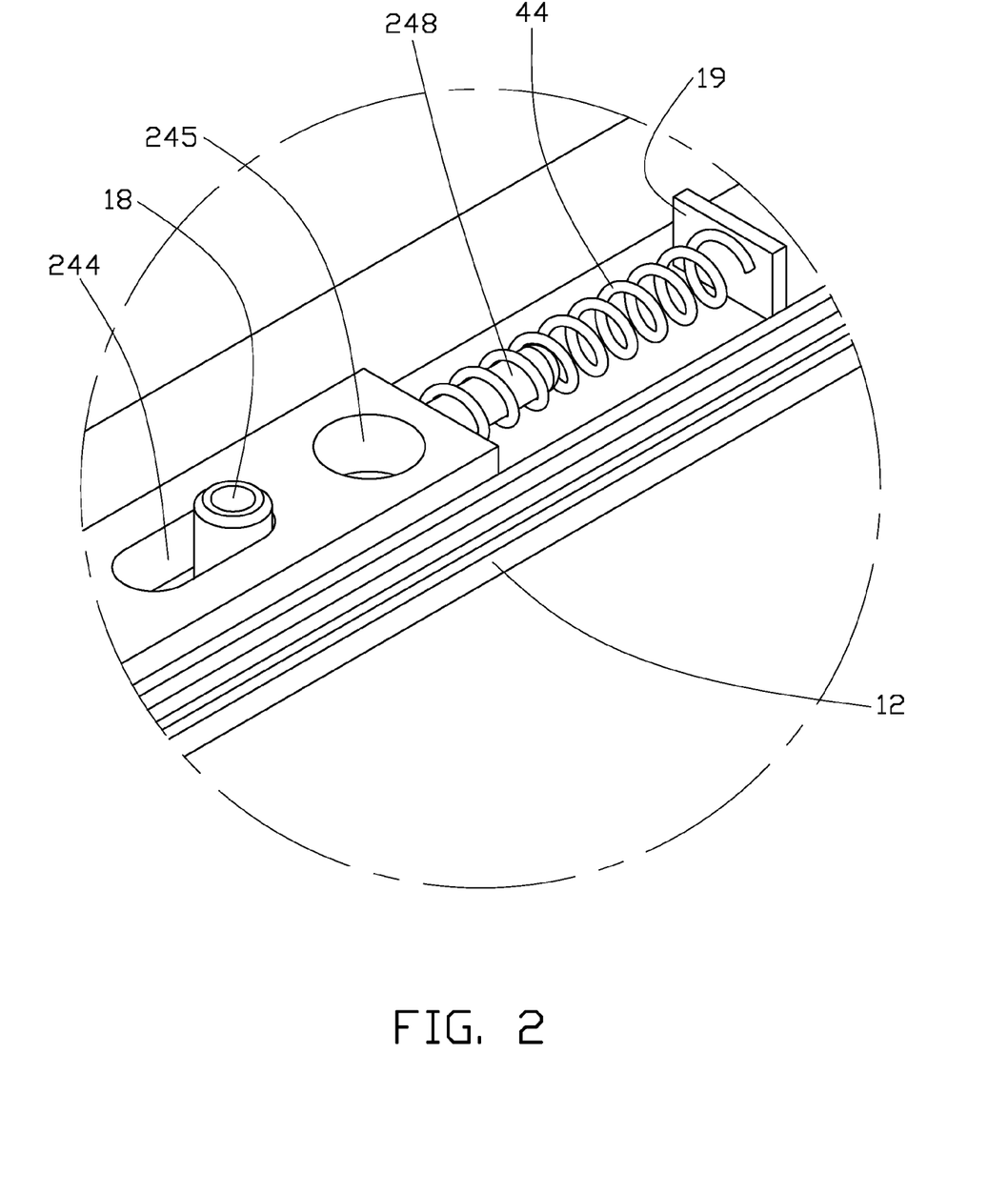
FIG. 2 is an enlarged isometric view of a circled portion II of FIG. 1.

A slanted engaging surface 246 is formed on a first end of the push member 24 contacting with the slanted surface 226 of the latching member 22. Referring particularly to FIG. 2, a post 248 protrudes from a second end of the push member 24. Two spaced sliding slots 244 are defined in the push member 24, and a hooking opening 242 is defined in a middle portion of the push member 24 between the sliding slots 244. A fixing hole 245 is defined in the push member 24.

Figure 1:
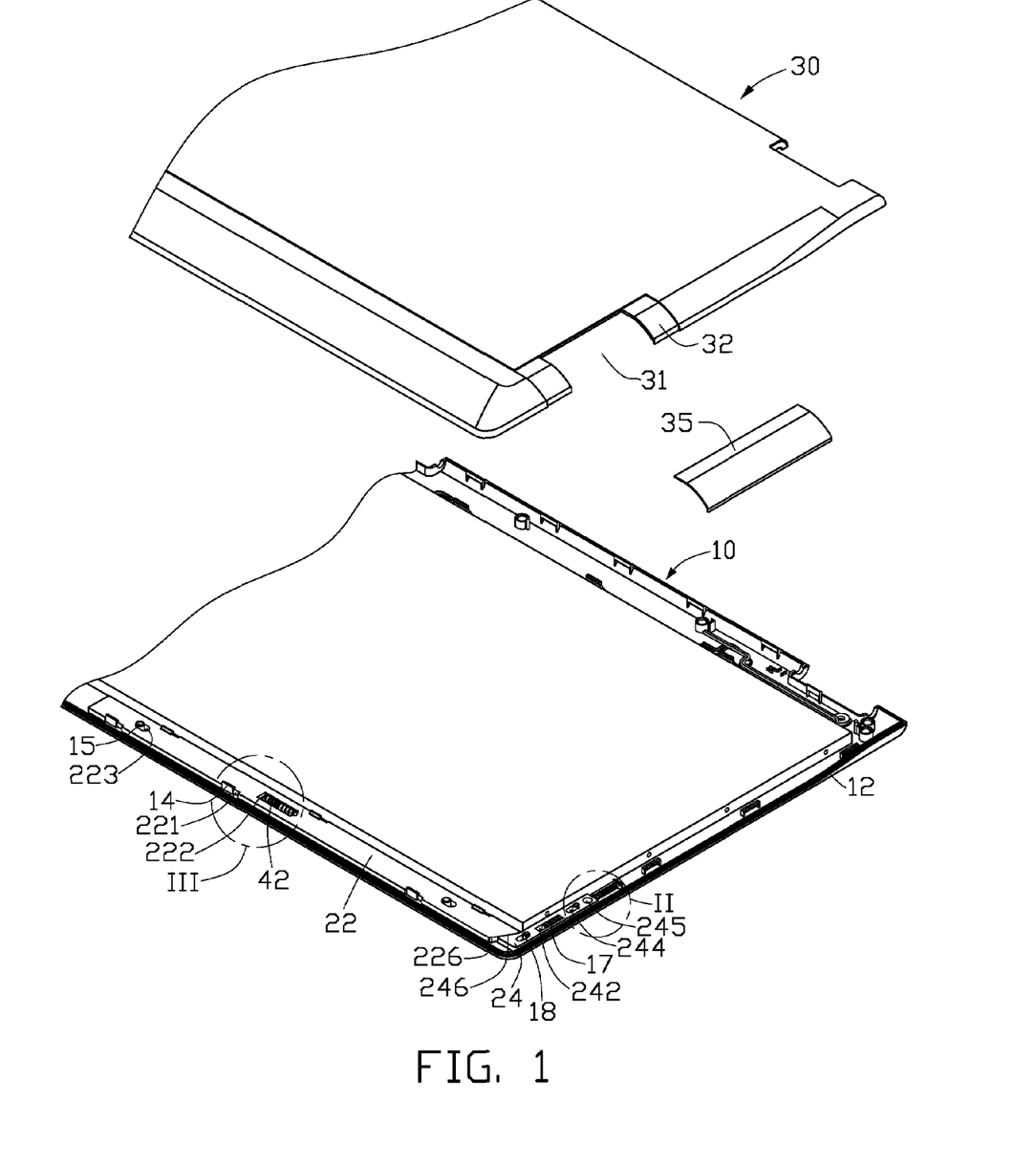
FIG. 1 is an exploded, partially sectioned isometric view of a latch mechanism with a cover unit in accordance with a preferred embodiment of the present invention, and the latch mechanism includes a sliding member.
Figure 3:
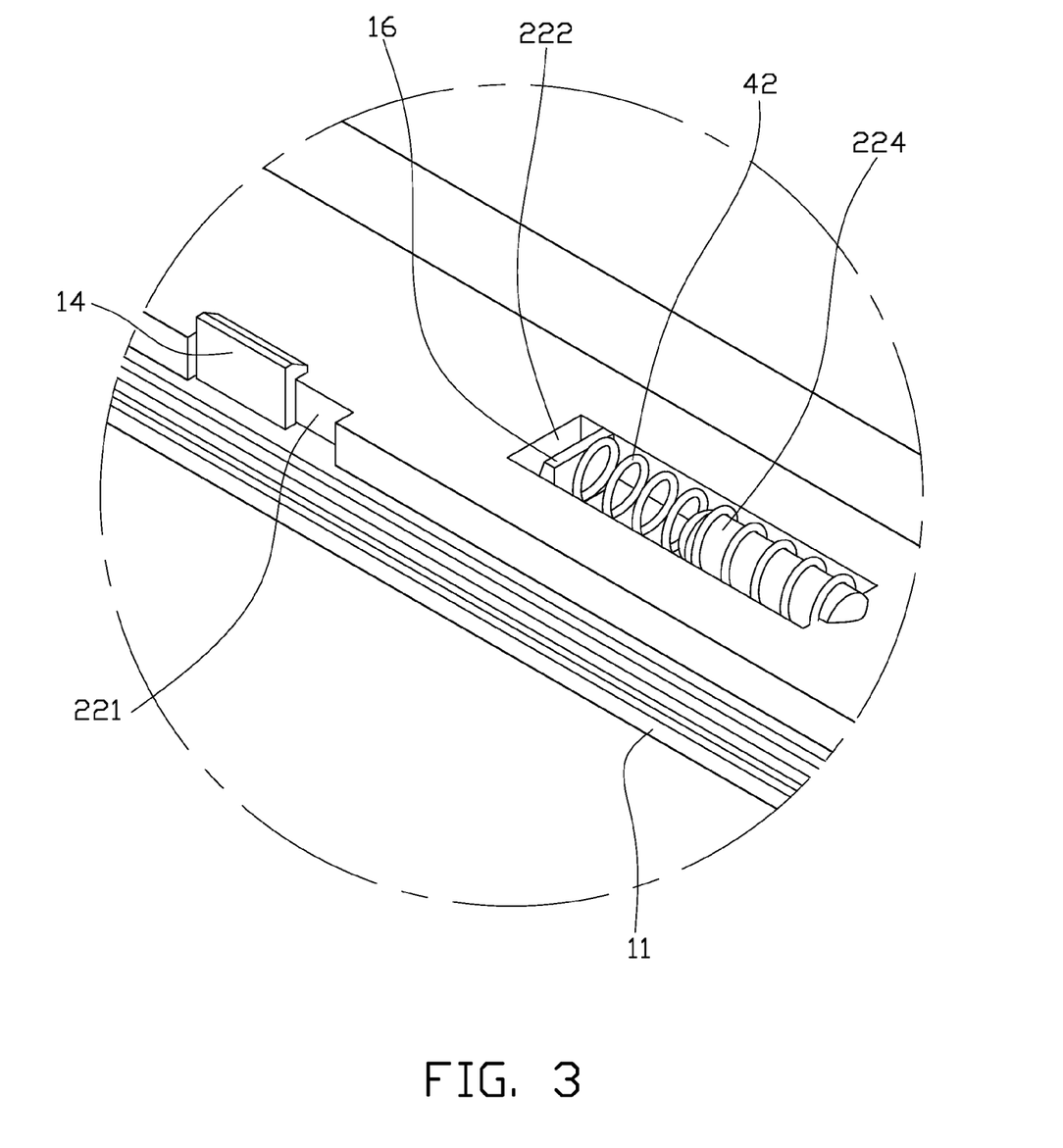
FIG. 3 is an enlarged isometric view of a circled portion III of FIG. 1.

The cover unit includes a first panel 10 holding an electronic component such as a liquid crystal display (not labeled) therein, and a second panel 30. The first panel 10 includes a front wall 11 (see FIG. 3) and a sidewall 12 generally perpendicular to the front wall 11. Referring to FIG. 5, two through holes 13 are defined in the first panel 10 adjacent the front wall 11, corresponding to the hooks 228 of the latching member 22. Referring to FIGS. 1 and 3, a plurality of staggered hooking members 14 is formed on an inside surface of the first panel 10 adjacent the front wall 11, for engaging in the corresponding notches 221 of the latching member 22. The inside surface of the first panel 10 adjacent the front wall 11 forms a first stop plate 16 and two positioning rods 15, corresponding to the receiving recess 222 and the sliding slots 223 of the latching member 22 respectively. The inside surface of the first panel 10 adjacent the sidewall 12 forms a hooking member 17 and two positioning rods 18, corresponding to the hooking opening 242 and the sliding slots 244 of the push member 24 respectively. Referring to FIG. 2, a second stop plate 19 is formed on the inside surface of the first panel 10 behind the hooking member 17 and the positioning rods 18. Referring back to FIG. 1, the second panel 30 defines an opening 31 in a sidewall thereof, corresponding to the sidewall 12 of the first panel 30. Two concave plates 32 are formed on the sidewall of the second panel 30 adjoining two sides of the opening 31, for supporting the sliding member 35 to slide thereon.

Referring to FIG. 4, a fixing portion 352 extends from a bottom section of the sliding member 35. Two latching portions 355 are formed on the bottom section of the sliding member 35 toward two ends of the sliding member 35 respectively.

Figure 7:
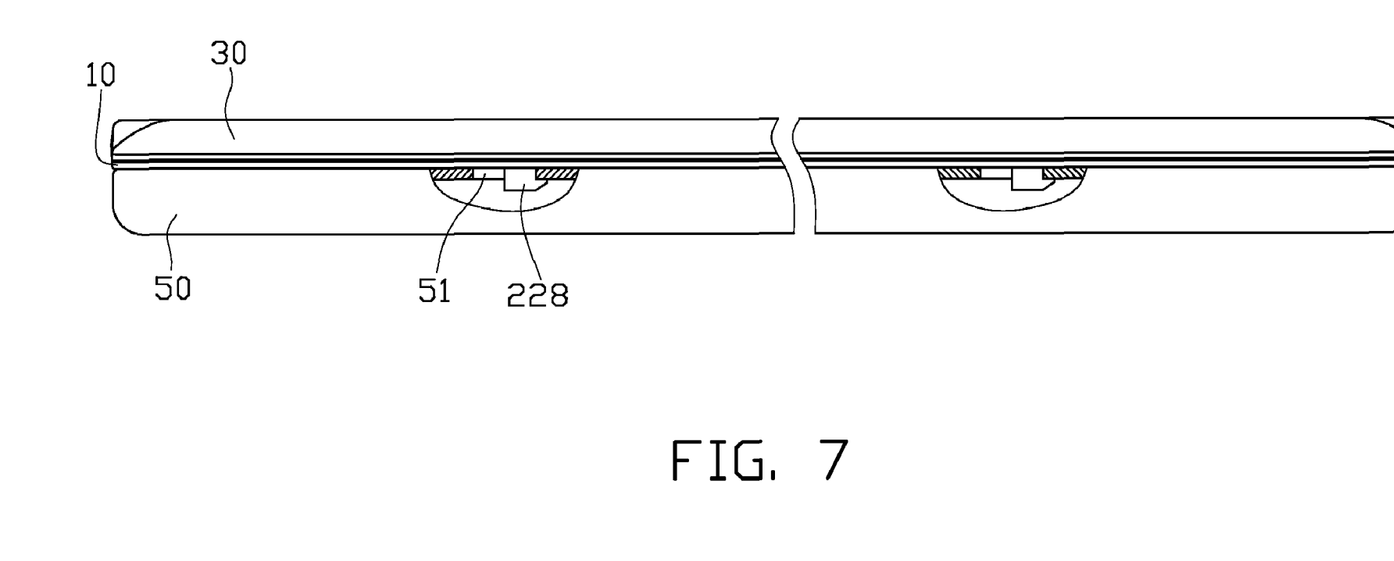
FIG. 7 is a schematic, assembled view of FIG. 1 with a base unit.

Referring to FIG. 7, the base unit 50 defines a pair of latching slots 51, corresponding to the hooks 228 of the latching member 22.

Referring further to FIGS. 1, 5 and 6, in assembly, the first elastic member 42 is placed around the post 224 in the receiving recess 222 of the latching member 22, the hooks 228 of the latching member 22 extend through the through holes 13 of the first panel 10 respectively. The slanted surface 226 of the latching member 22 is adjacent the sidewall 12 of the first panel 10. The hooking members 14 of the first panel 10 adjacent the front wall 11 engage in the corresponding notches 221 of the latching member 22, and the positioning rods 15 are received in the corresponding sliding slots 223. The first stop plate 16 is received in the receiving recess 222 of the latching member 22. One end of the first elastic member 42 abuts against the latching member 22, and the other end of the first elastic member 42 abuts against the first stop plate 16. The latching member 22 is thus slidably fixed to the first panel 10.

Thereafter, the second elastic member 44 is placed around the post 248 of the push member 24, the push member 24 is placed on the first panel 10 adjacent the sidewall 12, with the engaging surface 246 of the push member 24 abutting against the slanted surface 226 of the latching member 22. The hooking members 17 of the first panel 10 adjacent the sidewall 12 engage with the corresponding hooking opening 242 of the push member 24, and the positioning rods 18 are received in the corresponding sliding slots 244 of the push member 24. One end of the second elastic member 44 abuts against the push member 24, and the other end of the second elastic member 44 abuts against the second stop plate 19.

Finally, the sliding member 35 is mounted on the second panel 30, and the plates 32 of the second panel 30 are sandwiched by the sliding member 35 and the corresponding latching portions 355. The second panel 30 is fixed to the first panel 10 to cover one side of the liquid crystal display mounted in the first panel 10, and the fixing portion 352 of the sliding member 35 is inserted into the fixing hole 245 of the push member 24 on the first panel 10. Thereby, the cover unit is assembled, and the push member 24 is slidable with sliding of the sliding member 35 along the plates 32 of the second panel 30.

Referring further to FIG. 7, the cover unit is pivotably attached to the base unit 50. The cover unit is pivoted to cover the base unit 50 when the electronic device is not in use. When bottom surfaces of the hooks 228 abut against the portions adjoining the latching slots 51 of the base unit 50 respectively, the cover unit is further pressed down, and the latching member 22 is therefore pushed to compress the first elastic member 42 and slides away from the push member 24, until the hooks 228 entirely enter the latching slots 51 respectively. After that, the first elastic member 42 is restored to push the latching member 22 to slide toward the push member 24, and top surfaces of the hooks 228 engage with the portions of the base unit 50 adjoining the latching slots 51 respectively. Thus, the cover unit is locked to the base unit 50.

To unlock the cover unit from the base unit 50, the sliding member 35 is pushed toward a rear edge of the cover unit, and the fixing portion 352 of the sliding member 35 pushes the push member 24 to slide with the sliding member 35 in a direction along the sidewall 12 of the first panel 10. The second elastic member 44 is compressed. The engaging surface 246 of the push member 24 abuts against the slanted surface 226 of the latching member 22, and pushes the latching member 22 to slide in another direction along the front wall 11 perpendicular to the sidewall 12 of the first panel 10 and compresses the first elastic member 42. When the hooks 228 of the latching member 22 move in the corresponding latching slots 51 and disengage from the portions adjoining the latching slots 51 respectively, the cover unit is ready to be pivoted open by grasping the front wall of the cover unit. After opening the cover unit, the sliding member 35 is released allowing the second elastic member 44 to restore the push member 24.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A latch mechanism for locking a cover unit to a base unit, the latch mechanism comprising:
   a latching member slidably installed in the cover unit in parallel to a front wall thereof, the latching member comprising a hook engaging with the base unit;
   a push member slidably installed in the cover unit in parallel to a sidewall perpendicular to the front wall thereof; and
   a sliding member connected with the push member, and operated in a first direction to drive the push member to push the latching member to linearly move in a second direction, perpendicular to the first direction for disengaging the hook of the latching member from the base unit.

2. The latch mechanism as claimed in claim 1, wherein a slanted surface is formed on an end portion of the latching member, and a slanted engaging surface is formed on a front end of the push member for engaging with the slanted surface of the latching member to facilitate driving the latching member.

3. The latch mechanism as claimed in claim 1, wherein the latching member is a spring-loaded member.

4. The latch mechanism as claimed in claim 1, wherein the push member is a spring-loaded member.

5. The latch mechanism as claimed in claim 1, wherein the push member defines a fixing hole therein, a fixing portion extends from a bottom section of the sliding member for being inserted into the fixing hole of the push member.

6. An electronic device comprising:
   a cover unit enclosing an electronic component therein;
   a base unit;
   a latching member installed in the cover unit adjoining a first side of the electronic component and sliding along a first direction and engaging with the base unit; and
   a push member installed in the cover unit adjoining a second side of the electronic component and sliding along a second direction generally perpendicular to the first direction to actuate the latching member to slide in the first direction for disengaging from the base unit.

7. The electronic device as claimed in claim 6, wherein the base unit defines a latching slot therein, and the latching member forms a hook engagable with the base unit through the latching slot.

8. The electronic device as claimed in claim 6, wherein the latching member defines a receiving recess, a post extends from a portion of the latching member bounding the receiving recess, and a first stop plate is formed on the cover unit and received in the receiving recess, a first elastic member is placed around the post, with one end abutting against the latching member and the other end abutting against the first stop plate.

9. The electronic device as claimed in claim 6, wherein a slanted surface is formed on an end portion of the latching member, and a slanted engaging surface is formed on a first end of the push member for contacting with the slanted surface of the latching member.

10. The electronic device as claimed in claim 9, wherein a post protrudes from a second end of the push member, a second stop plate is formed on the cover unit, a second elastic member is placed around the post, with one end abutting against the push member and the other end abutting against the second stop plate.

11. The electronic device as claimed in claim 6, wherein a plurality of staggered notches is defined in a front edge and a rear edge of the latching member, and a plurality of hooking members is formed on the cover unit for engaging in the corresponding notches.

12. The electronic device as claimed in claim 6, wherein a hooking opening is defined in the push member, and a hooking member extends from the cover unit through the hooking opening to engage with the push member in a third direction perpendicular to the first and second directions.

13. The electronic device as claimed in claim 6, wherein each of the latching member and the push member defines two sliding slots, and a plurality of positioning rods is formed on the cover unit and received in the corresponding sliding slots for guiding sliding of the latching member and the push member.

14. The electronic device as claimed in claim 6, wherein a sliding member is connected to the push member and operatively accessible from outside of the cover unit.

15. The electronic device as claimed in claim 14, wherein the cover unit defines an opening in a sidewall thereof corresponding to the push member, two concave plates are formed on the sidewall of the cover unit adjoining two sides of the opening, two latching portions are formed on the sliding member toward two ends thereof for engaging with the corresponding plates to slidably attach the sliding member to the cover unit.

16. The electronic device as claimed in claim 6, wherein the electronic component is a liquid crystal display.

17. An electronic device comprising:
a base unit;
a cover unit having a longitudinal side pivotably connected to one side of the base unit;
a latching member attached to an opposite longitudinal side of the cover unit latching the base unit to lock the cover unit with the base unit, the latching member sliding along the opposite longitudinal side of the cover unit between a locked position at which the latching member is locked with the base unit and an unlocked position at which the latching member is unlocked with the base unit;
a pushing member attached to a lateral side perpendicularly sandwiched between the longitudinal sides of the cover unit in such a manner that the pushing member slides along the lateral side of the cover unit in a first direction to drive the latching member to slide from the locked position to the unlocked position in a second direction perpendicular to the first direction;
an operation member being accessible from outside of the cover unit, driving the pushing member to slide; and
a restoring member attached to the cover unit restoring the latching member from the unlocked position to the locked position.

18. The electronic device as claimed in claim 17, wherein the latching member forms a slanted surface and the pushing member forms another slanted surface engaging with said slanted surface of the latching member in such a manner that when the pushing member slides along the lateral side of the cover unit said another slanted surface pushes said slanted surface to cause the latching member to slide from the locked position to the unlocked position.

19. The electronic device as claimed in claim 17, wherein the cover unit comprises a first panel adjacent the base unit and a second panel covered on the first panel and opposite from the base unit, the pushing member is attached to the first panel, and the operation member has a latching portion slidably sandwiching an edge portion of the second panel with the operation member.

20. The electronic device as claimed in claim 19, wherein the first panel forms a plurality of hooks configured for holding the latching member and the pushing member to the first panel in a direction perpendicular to the first panel.

\* \* \* \* \*